(12) United States Patent
Ignatovich et al.

(10) Patent No.: US 7,249,664 B2
(45) Date of Patent: Jul. 31, 2007

(54) FAN DRIVE HAVING PRESSURE CONTROL (FLUID) OF A WET FRICTION FAN DRIVE

(75) Inventors: James E. Ignatovich, Ceresco, MI (US); Theodore A. Malott, Jackson, MI (US); Dale Pickelman, Marshall, MI (US)

(73) Assignee: BorgWarner Inc., Auburn Hills, MI (US)

( * ) Notice: Subject to any disclaimer, the term of this patent is extended or adjusted under 35 U.S.C. 154(b) by 122 days.

(21) Appl. No.: 11/079,040

(22) Filed: Mar. 14, 2005

(65) Prior Publication Data

US 2006/0201771 A1    Sep. 14, 2006

(51) Int. Cl.
F16D 25/0638    (2006.01)

(52) U.S. Cl. .................. 192/85 AA; 192/82 T

(58) Field of Classification Search ........................ None
See application file for complete search history.

(56) References Cited

U.S. PATENT DOCUMENTS

| | | | |
|---|---|---|---|
| 2,960,202 A * | 11/1960 | Stevens et al. .......... | 192/103 F |
| 3,402,793 A | 9/1968 | Scholl | |
| 3,804,219 A | 4/1974 | Cummings, III | |
| 4,546,742 A | 10/1985 | Sturges | |
| 4,555,910 A | 12/1985 | Sturges | |
| 4,899,785 A * | 2/1990 | Inokuchi ................. | 192/109 F |
| 4,899,861 A | 2/1990 | Cummings, III | |
| 4,913,102 A | 4/1990 | Ohmura et al. | |
| 5,307,644 A | 5/1994 | Cummins et al. | |
| 5,483,927 A | 1/1996 | Letang et al. | |
| 5,531,190 A | 7/1996 | Mork | |
| 5,584,371 A | 12/1996 | Kelledes et al. | |
| 5,855,266 A | 1/1999 | Cummings, III | |
| 5,937,979 A | 8/1999 | Cummings | |
| 5,947,247 A | 9/1999 | Cummings, III | |
| 6,067,489 A | 5/2000 | Letang et al. | |
| 6,164,322 A * | 12/2000 | Najmolhoda et al. ....... | 137/540 |
| 6,286,535 B1 * | 9/2001 | Harms et al. ................. | 137/14 |
| 6,772,714 B2 | 8/2004 | Laird et al. | |
| 2003/0172883 A1 | 9/2003 | Shiozaki et al. | |
| 2004/0011306 A1 | 1/2004 | Liederman et al. | |

FOREIGN PATENT DOCUMENTS

EP    1 510 716 A1 *    3/2005

* cited by examiner

*Primary Examiner*—Rodney H. Bonck
(74) *Attorney, Agent, or Firm*—Greg Deiegielewski, Esq.; Artz & Artz, P.C.

(57) ABSTRACT

A hydraulically controlled fan drive system (12) having a method of engagement includes a housing assembly (20) containing a hydraulic fluid (48) and an engaging circuit (36). The engaging circuit (36) includes a pitot tube (152) coupled within the housing assembly (20) that receives at least a portion of the hydraulic fluid (48). An engaging circuit (36) engages the housing assembly (20) to a fan shaft (44) in response to supply of the hydraulic fluid (48) from the pitot tube (152). An electrical control circuit (40) having a relief valve assembly (225) coupled to a main controller (176) is used to control the fluid pressure within the pitot tube (152) that controls the engagement of the housing assembly (20).

7 Claims, 3 Drawing Sheets

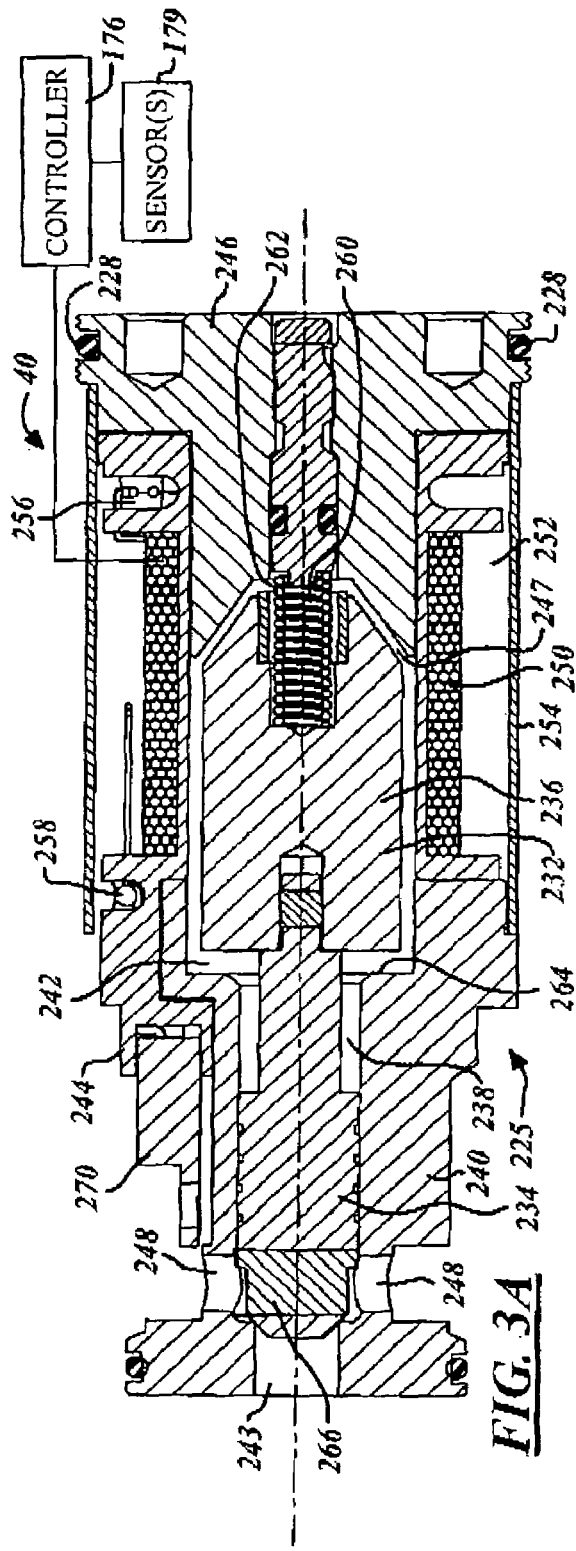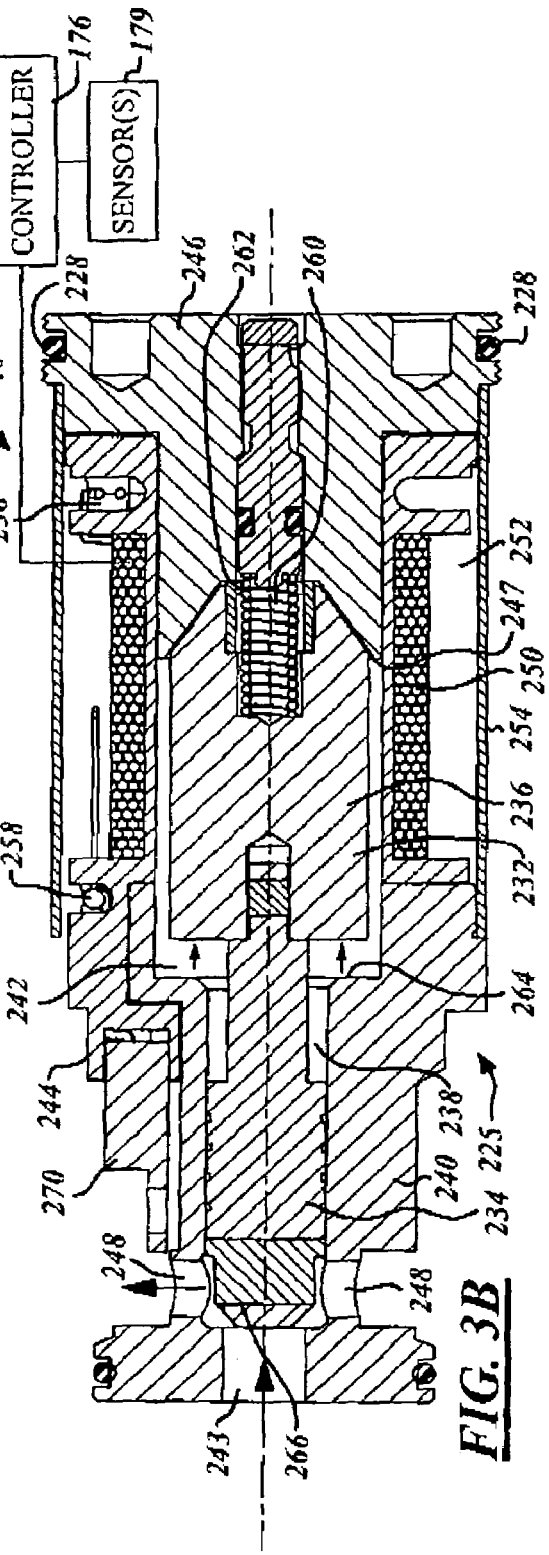

FAN DRIVE HAVING PRESSURE CONTROL (FLUID) OF A WET FRICTION FAN DRIVE

TECHNICAL FIELD

The invention relates generally to fan drive systems and more specifically to a hydraulically controlled fan drive system with integral cooling.

BACKGROUND ART

The present invention relates to friction coupling devices and fluid coupling devices, such as friction clutch assemblies and viscous drives; the fluid coupling devices being of the type that include both a fluid operating chamber and a fluid reservoir chamber, and valving to control the quantity of fluid in the operating chamber.

Although the present invention may be used advantageously in various configurations and applications, it is especially advantageous in a coupling device of the type used to drive a radiator cooling fan of an internal combustion engine for a over the road truck, such as a class 8 truck, and will be described in connection therewith.

Friction coupling devices and fluid coupling devices that drive radiator cooling fans are generally of two types, dry friction clutch assemblies and viscous drives, respectively.

Dry friction clutch assemblies tend to have two operating conditions "ON and OFF" referring to when a friction clutch is either fully engaged or fully disengaged. When a friction clutch assembly is providing cooling the clutch is fully engaged and not slipping. When the friction clutch assembly is not providing cooling the assembly is fully disengaged and slip speed is at a maximum between a clutch plate and an engagement surface.

The dry friction clutch assemblies generally have low thermal capacity, since they typically do not incorporate fluid flow cooling mechanisms. Thus, the clutch assemblies have minimal cooling capability and are unable to cycle repeat in short durations of time. Also, because of low thermal capacity, the clutch assemblies are also limited in torsional capacity, such that they are incapable of engaging at high engine revolutions per minute (rpm) or high engine speeds. The thermal energy that is generated during engagement at high engine rpm speeds can "burn up" or cause the clutch assembly to become inoperative.

Viscous drives, on the other hand, have become popular due to their ability to cycle repeat, engage at higher engine speeds, and have varying degrees of engagement. Viscous drives have an operating range of engagement and are generally less engaged at higher engine speeds and generally more engaged at lower engine speeds. Viscous drives are never fully engaged for internal viscous shear purposes.

Unfortunately, viscous drives are also thermally and torsionally limited. Viscous drives are always slipping to some degree causing them to be incapable of turning at fully engaged peak operating speeds or at higher speeds than originally designed. Since viscous drives are continuously slipping, they are continuously generating heat, unlike friction clutch assemblies. Viscous drives are further limited in that the more engine cooling needed the larger and more costly the viscous drive and cooling fan that is required. Thus, for increased engine cooling requirements viscous drives can become impractical in size and cost.

Due to increased engine cooling requirements, a current desire exists for a fan drive system that is capable of not only providing an increased amount of cooling over traditional fan drive systems but also that it have the associated advantages of a friction clutch assembly and of a viscous drive, as stated above, without the associated disadvantages. It is also desirable that the fan drive system be practical and reasonable in size and cost, so as to be approximately similar to and preferably not to exceed that of traditional fan drive systems.

SUMMARY OF THE INVENTION

The present invention addresses the issues described above and provides a system and method of engaging a fan drive. A hydraulically controlled fan drive system having a method of engagement is provided. The hydraulically controlled system includes a housing assembly containing a hydraulic fluid and an engaging circuit. The engaging circuit includes a pitot tube coupled within the housing assembly that receives at least a portion of the hydraulic fluid. An engaging circuit engages the housing assembly to a fan shaft in response to supply of the hydraulic fluid from the pitot tube.

One of several advantages of the present invention is that it converts fluid velocity into pressure through use of the pitot tube to generate normal force for engagement purposes. In so doing, the present invention provides variable engagement via internal hydraulic pressure control. The pitot tube provides an inexpensive pressure supply source that requires minimum space within the fan drive system.

Another advantage of the present invention is that it includes multiple cooling devices for additional cooling of the fan drive system. The cooling devices include a variable cooling circuit and a dual part clutch housing with integrated cooling fins. In having increased fan drive system cooling the present invention is capable of rotating at high speeds for increased cooling capability and minimizes size of the drive system.

Furthermore, the present invention provides a fan drive system that incorporates cooling, engagement circuitry, and control circuitry within a single assembly allowing for ease of assembly and integration into a larger system such as an engine or a vehicle, while at the same time being capable of utilizing external control circuitry.

Moreover, the present invention defaults to an engaged state providing engine cooling when control systems are inoperative and in so doing also provides diagnostic ease.

In addition, the present invention provides a pressure relief mechanism within the engaging circuit that relieves excessive pressure buildup within the pitot tube, therein preventing or minimizing damage to the hydraulic fan drive system associated with the excessive pressure.

Yet another advantage of the present invention is that it provides versatility in output torque control in that multiple style control circuits may be utilized depending upon the application. More specifically, in one preferred embodiment, the fan drive system utilizes a pulse-width modulated solenoid that averages the open time of the pressure relief valve to precisely control the clutch pack engagement and resulting output torque. In another preferred embodiment, a linear solenoid is used to control the opening and closing of the valve. In this arrangement, some type of valve position feedback is incorporated into the controller to control the amount of open time required.

The present invention itself, together with attendant advantages, will be best understood by reference to the following detailed description, taken in conjunction with the accompanying figures.

BRIEF DESCRIPTION OF THE DRAWINGS

FIG. 3A is a cross-sectional view of a portion of the hydraulically controlled system utilizing a pressure relief valve in a closed position in accordance with a preferred embodiment of the present invention; and FIG. 3B is a cross-sectional view of a portion of the hydraulically controlled system utilizing a pressure relief valve in an open position in accordance with a preferred embodiment of the present invention.

BEST MODE(S) FOR CARRYING OUT THE INVENTION

Figure 1:
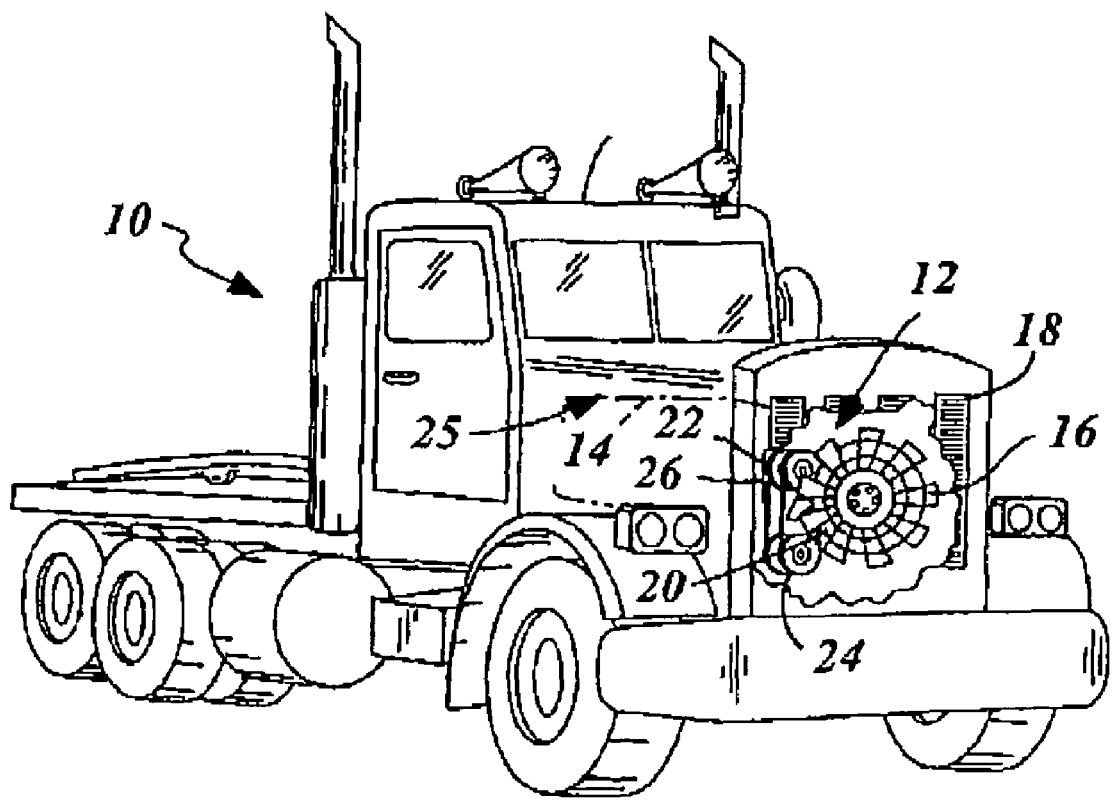
FIG. 1 is a perspective view of a vehicle utilizing a hydraulically controlled fan drive system in accordance with an embodiment of the present invention.

In the following figures the same reference numerals will be used to refer to the same components. While the present invention is described with respect to a method and system for a hydraulically controlled fan drive system, the present invention may be adapted and applied to various systems including: vehicle systems, cooling systems, fan drive systems, friction drive systems, or other systems.

In the following description, various operating parameters and components are described for one constructed embodiment. These specific parameters and components are included as examples and are not meant to be limiting.

Also, in the following description various fan drive components and assemblies are described as an illustrative example. The fan drive components and assemblies may be modified depending upon the application.

Referring now to FIG. 1, a perspective view of a vehicle 10 utilizing a hydraulically controlled fan drive system 12 in accordance with an embodiment of the present invention is shown. The system 12 uses rotational energy from a liquid cooled engine 14 at an increased ratio to turn a radiator cooling fan 16 to provide airflow through a radiator 18. The system 12 includes a housing assembly 20 fixed to a pulley 22, which is coupled to and rotates relative to a crankshaft (not shown) of the engine 14, via a pair of belts 24, within an engine compartment 25. Of course, the present invention may be relatively operative in relation to various components and via any number of belts or other coupling devices, such as a timing chain. The housing assembly 20 is mounted on the engine 14 via a mounting bracket 26. The housing assembly 20 hydraulically engages the fan 16 during desired cooling intervals to reduce temperature of the engine 14 or to perform other tasks further discussed below.

The fan 16 may be attached to the housing assembly 20 by any suitable means, such as is generally well known in the art. It should be understood, however, that the use of the present invention is not limited to any particular configuration of the system 12, or fan mounting arrangement, or any particular application for the system 12, except as is specifically noted hereinafter.

Figure 2:
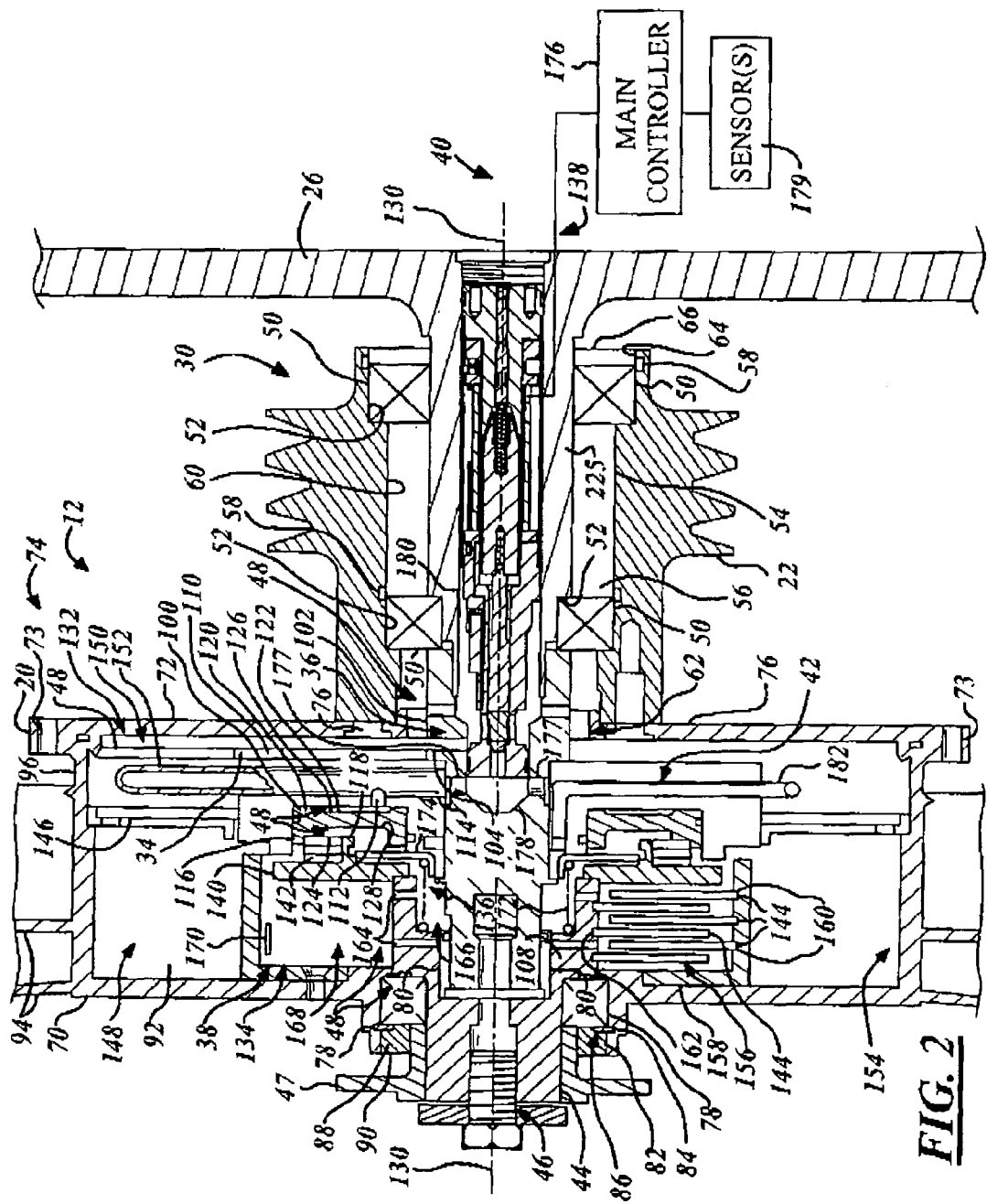
FIG. 2 is a cross-sectional view of the hydraulically controlled system in accordance with an embodiment of the present invention.

Referring now to FIG. 2, a cross-sectional view of the system 12 in accordance with an embodiment of the present invention are shown. The system 12 includes an input circuit 30, the housing assembly 20, a piston assembly 34, an engaging circuit 36 having a mechanical portion 38 and an electrical portion 40, and a variable cooling and lubrication circuit 42. The input circuit 30 provides rotational energy to the housing assembly 20. The engaging circuit 36 engages the housing assembly 20 to a fan shaft 44, via the piston assembly 34, to rotate the fan 16. The fan 16 may be coupled to the fan shaft 44 via splines 46, which is threaded into the fan shaft 44, or by other techniques known in the art, such as being coupled to the fan hub 47. The fan shaft 44 may be a single unit, as shown, or may be split into a fan shaft portion and a clutch shaft portion. The variable cooling circuit 42 provides distribution of hydraulic fluid 48 throughout and in turn cooling and lubricating components within the housing assembly 20. The hydraulic fluid may be an oil-based fluid or similar fluid known in the art.

The input circuit 30 includes the pulley 22 that rotates about the mounting bracket 26 on a set of pulley bearings 50. The pulley bearings 50 are held between pulley bearing notches 52, in a stepped inner channel 54 of the pulley 22, and pulley bearing retaining rings 56, that expand into pulley ring slots 58 in an interior wall 60 of the pulley 22. The pulley 22 may be of various type and style, as known in the art. The inner channel 54 corresponds with a first center opening 62 in the housing assembly 20. The hydraulic fluid 48 flows through the center opening 62 into the inner channel 54 and cools and lubricates the bearings 50. A first seal 64 resides in the inner channel 54 on an engine side 66 of the pulley 22 for retaining the hydraulic fluid 48 within the housing assembly 20.

The housing assembly 20 includes a die cast body member 70, and a die cast cover member 72, that may be secured together by bolts (not shown) through channels 73 of the outer periphery 74 of the die cast member 70 and cover member 72. The die cast member 70 and the cover member 72 may be secured together using other methods known in the art. It should be understood that the present invention is not limited to use with a cast cover member, but may also be used with other members such as a stamped cover member. The housing assembly 20 is fastened to the pulley 22, via fasteners (not shown) extending through the cover member 20 into the pulley 22 in designated fastener holes 76. The housing assembly 20 rotates in direct relation with the pulley 22 and rides on housing bearings 78 that exists between the housing assembly 20 and the fan shaft 44. The housing bearing 78 is held within the housing assembly 20 between a corresponding housing bearing notch 80 in the body member 70 and a housing bearing retainer ring 82 that expands into a housing ring slot 84. A second center opening 86 exists in the body member 70 to allow the hydraulic fluid 48 to also circulate, cool, and lubricate the housing bearings 78. A second seal 88 resides on a fan side 90 of the housing assembly 20 for retaining the hydraulic fluid 48 within the housing assembly 20.

The body member 70 has a fluid reservoir 92 containing the hydraulic fluid 48. Cooling fins 94 are coupled to an exterior side 96 of the body member 70 and perform as a heat exchanger by removing heat from the hydraulic fluid 48 and releasing it within the engine compartment 25. The cover member 72 may be fastened to the body member 70 using various methods known in the art. For further explanation of the housing assembly 20 see U.S. Pat. No. 6,565,320, entitled "Molded Cooling Fan", which is incorporated by reference herein. Note, although the fan 16 is shown as being attached to the body member 70 it may be coupled to the cover member 72.

The piston assembly 34 includes a piston housing 100 rigidly coupled to a distribution block 102, which is rigidly coupled to the bracket 26 on a first end 104. The distribution block 102 is coupled to a fan shaft bearing 78 on a second end 108, which allows the fan shaft 44 to rotate about the second end 108. The piston housing 100 has a main pitot tube channel 110, that has a piston branch 112 and a controller branch 114, for flow of the hydraulic fluid 48 to a translating piston 116 and to a hydraulic fluid controller 118. The piston 116 is coupled within a toroidally shaped channel 120 of the housing 100 and has a pressure side 122 and a drive side 124, with a respective pressure pocket 126 and drive pocket 128. The piston translates along a center axis 130 to engage the housing assembly 20 to the fan shaft 44, via hydraulic fluid pressure from the piston branch 112.

The engaging circuit 36 includes a hydraulic fluid supply circuit 132, a clutch plate assembly 134, a return assembly 136, and a control circuit 138. The hydraulic circuit 132 applies pressure on the piston 116 to drive an end plate 140, riding on a separation bearing 142 between the endplate 140 and the piston 116, against clutch plates 144 within the clutch plate assembly 134 and engages the fan 16. The control circuit 138 controls operation of the piston 116 and engagement of the fan 16. Of course, any number of clutch plates may be used. Also, although a series of clutch plates are utilized to engage the fan 16 other engagement techniques known in the art may be utilized.

The hydraulic circuit 132 may include a baffle 146 separating a relatively hot cavity side 148 from a relatively cool cavity side 150 of the fluid reservoir 92 and a pressure pitot tube 152. The pressure tube 152 although shown as being tubular in shape may be of various sizes and shapes. The pressure tube 152 receives hydraulic fluid 48 from within the cool side 150, providing cooling to the engaging circuit 36, due to flow of the fluid 48 from rotation of the housing assembly 20, carrying the fluid 48 in a radial pattern around an inner periphery 154 of the housing assembly 20. The pressure tube 152 is rigidly coupled within the main channel 110 and is therefore stationary. As fluid 48 is circulating about the inner periphery 154, a portion of the fluid 48 enters the pressure tube 152 and applies pressure on the pressure side 122 of the piston 116. Bernoulli's equation, shown as equation 1, relates pressure to the fluid velocity because pressure is created by fluid momentum (mass times velocity:

$$P_v = \frac{\rho V^2}{2g} \quad [1]$$

In using equation 1, resulting velocity V on the clutch plate assembly 134 is represented in terms of velocity pressure P, density ρ, and gravity g. Thus, as the rotational speed of the housing assembly 20 increases pressure applied on the clutch assembly 134 also increases providing variable drive speed of the fan 16, as further discussed below. Pressure P within the pressure tube 152 varies proportional with square of velocity V, and since torque of the fan 16 also varies with square of the velocity V, the fan 16 rotates at an approximately proportional constant percentage of input speed or velocity V.

Since the fan 16 has a variable drive speed due to proportional pressure within the pressure tube 152, at low engine speeds, such as during an idle condition, the fan 16 is rotating at a low speed. When the engine 14 is power OFF, there is minimum torque existing in the fan 16, which may be absorbed by the belts 24, unlike that of prior art systems. In a conventional fan clutch system when a fan is rotating or engaged, the fan is typically rotating at a high speed. When an engine is power OFF, torque existing in the conventional fan and fan clutch system is transferred into engine belts, degrading and damaging the belts. Some conventional systems incorporate electronic control devices, such that when an ignition system is powered OFF, the fan clutch system is disengaged before the engine is powered OFF. The additional electronic control devices add complexity and costs. Also, it is generally undesirable to allow an engine to continue running for a time period after an ignition is powered OFF. The present invention eliminates the need for the additional electronic devices and the initial disengagement of a fan clutch system, due to its proportional fan rotating speed design as stated above.

The clutch plate assembly 134 includes a clutch pack 156 within a drum housing 158. The clutch pack 156 includes the multiple clutch plates 144 separated into a first series 160 coupled to the drum housing 158 and a second series 162 coupled to the fan shaft 44. The piston 116 drives the endplate 140 to apply pressure on the clutch plates 144, which engages the fan 16. The fan shaft 44 has multiple cooling passageways 164 that extend between a fan shaft chamber 166 and an inner drum chamber 168 allowing passage of fluid 48 therein. Fluid 48 after entering the drum chamber 168 passes across and directly cools the plates 144 and returns to the fluid reservoir 92 through slots 170 in the drum housing 158. The slots 170 may be of various size and shape and have various orientations relative to the center axis 130. The cooling passageways 164 although shown as extending perpendicular to the center axis 130 may extend parallel to the center axis 130, similar to the slots 170.

The return assembly 136 includes a set of return springs 172 and a spring retainer 174. The springs 172 reside in the fan shaft chamber 166 and are coupled between the fan shaft 44 and the spring retainer 174. The spring retainer 174 has a quarter cross-section that is "L" in shape and is coupled between the drive side 124 and the end plate 140. The springs 172 are in compression and exert force on the piston 116 so as to disengage the clutch plates 144 when fluid pressure on the pressure side 122 is below a predetermined level.

The cooling circuit 42 also includes a second pitot tube or lubrication tube 182. Although, only a single lubrication tube is shown, any number of lubrication tubes may be used, especially in applications where increased flow is desired. The lubrication tube 182 provides high flow rates at low pressures and as with the first tube may be of various size and shape. Fluid 48, from the cool side 150, enters the lubrication tube 182 and is directed into the fan shaft chamber 166 where it then passes through the cooling passageways 164 and cools the clutch pack 156. Fluid 48 may also exit the fan shaft chamber 166 through the slots 170. Fluid exiting from the fan shaft chamber 166 or the drum housing 158 enters the hot side 148, where the cooling fins 94 dissipate heat therefrom into the engine compartment 25. The cooling circuit 42 not only cools and lubricates the clutch pack 156 but also other portions of the engaging circuit 36.

Referring now to FIGS. 3A and 3B, the electrical portion 40 of the control circuit 138 utilizes a relief valve assembly 225 electrically coupled to a main controller 176 to electrically control the fluid pressure within the pitot tube 152. As will also be seen below, the relief valve assembly also is capable of mechanically controlling the fluid pressure within the pitot tube 152 above certain maximum threshold pressures. The relief valve assembly 225 is preferably screwed into the mounting bracket 26 and sealed using an o-ring 228. Alternatively, the relief valve assembly may be press fit into the mounting bracket 26.

The relief valve assembly 225 includes an armature assembly 232 having a valve 234 coupled to an armature 236. The valve 234 is coupled within an inner cavity region 238 of the valve body 240, while the armature 236 is coupled within a cavity region 242 defined within the valve 234, the coil bobbin 244, and a pole piece 246. The valve body 240 has a pair of vents 248 that are in fluid communication with the hydraulic supply circuit 132. An air gap 247 is also created between the armature 236 and the pole piece 246.

A coil 250 electrically coupled to a main controller 176 is contained within a cavity region 252 defined between the coil bobbin 244 and a flux tube 254. Also contained within the cavity region 250 are a bi-directional diode pack 256 and a resistor 258.

The armature assembly 232 is coupled to a spring 260 that is contained within a spring retainer 262 that is contained within the pole piece 246. The spring 260 normally biases the armature 236 against a shoulder 264 of the valve body 240 such that the end 266 of the valve 234 covers the vents 248. This is known as the closed position and is shown in FIG. 3A.

The main controller 176 is electrically coupled to various engine operating sensors 179 and may be contained within the system 12 or may be separate from the system 12 as shown. The main controller 176 is preferably microprocessor based such as a computer having a central processing unit, memory (RAM and/or ROM), and associated input and output buses. The main controller 176 may be a portion of a central vehicle main control unit, an interactive vehicle dynamics module, a cooling system controller, or may be a stand-alone controller as shown. The main controller 176 generates a cooling signal, in the form of a pulse width modulated (PWM) current or analog current, containing information such as when cooling is desired and the amount of cooling that is desired.

When current is passed through the coil 250 from the controller 176, a magnetic flux is created that extends through the armature 236, air gap 247, pole piece 246 flux tube 254, and valve body 240. The magnetic flux created urges the armature assembly 232 to move axially towards the spring 250, the amount of movement dependent upon the size of the magnetic flux created. The movement rightward of the valve 234, as shown in FIG. 3B, unseals the vents 248, also known as the open position, therein allowing fluid 48 to escape from the pitot tube 152, through a tubular region 243, and out the vents 248 to the hydraulic circuit 132, where the hydraulic fluid 48 then returns to the fluid reservoir 92. This decreases the fluid pressure within the pitot tube 152. The decreased fluid pressure in the pitot tube 152, as a result of the venting, allows the piston 116 to move away from the clutch pack 156, therein disengaging the plates 144 and decreasing the fan 16 rotational speed.

Of course, while FIG. 3B shows the armature assembly in a fully open position, any number of intermediate partially open positions may be achieved, depending upon the strength of the electrical current sent to the coil. Thus, a partially opened position, wherein the valve 234 partially unseals the vents, allows the fluid pressure to be more precisely controlled.

The PWM system design requires control of the duty cycle to control the average "open" time of the relief valve assembly 225. The inherent accumulator effect of the fan drive allows pressure to build when the valve assembly 225 is closed, and fall when the valve assembly 225 is open. The cyclic fluid pressure is averaged on the piston 116 and clutch pack 156 and results in a controlled torque to the output shaft.

The analog system design works in substantially the same manner as the PWM design, but does not "average" the cyclic fluid pressure. Instead, the solenoid design offers a given flow rate for a given current electrical signal. In this design, some type of valve position feedback to the embedded controller or main controller 176 is required.

Also shown in FIGS. 2, 3A and 3B is an internal temperature protection device 270 in accordance with another embodiment of the present invention. The device 270 is positioned within the cavity created by the vents 248 and within the flux tube 254. The device is electrically coupled to the bi-directional diode pack 256 and resistor 258, which are also electrically coupled in series to the coil 250 and main controller 176.

The device 270 is temperature sensitive in that when temperature of the hydraulic fluid 48 exceeds a predetermined temperature level, the device 270 prevents currents from flowing from the main controller 176 to the coil 250. This maintains the assembly 225 in the closed position, allowing a majority of the fluid within the pressure tube 152 to be directed trough the piston branch and fully engage the plates 144. By fully engaging the plates 144 there is no slip present between the plates 144 and temperature of the plates 14 as well as the fluid 48 and the system 12 decreases.

As mentioned above, the relief valve assembly 225 also utilizes a separate fail-safe mechanism deigned to prevent damage to the fan assembly during use. As the fluid pressure in the pitot tube 152 builds during normal operation, it exerts pressure on the end 266 of the valve 232 through the tubular region 243. At a certain threshold pressure, the fluid pressure is sufficient to overcome the spring 260 to force the valve 232 axially towards the spring 250 to the open position, therein allowing a portion of the fluid 48 within the pitot tube 152 to escape through the tubular region 243 and vents 244 and return to the fluid reservoir 92. The valve assembly 225 remains in the open position until such time as the fluid pressure within the pitot tube 152 is a level at or below the predetermined threshold pressure. This axial movement may therefore occur even in the absence of electrical activation of the coil 280.

Of course, as one skilled in the art recognizes, the threshold pressure is depended upon the strength of spring 260 urging the valve 232 to cover the vents 248. A stronger spring 260 will require higher fluid pressure to expose the vents 248. Thus, systems requiring a lower threshold pressure venting would utilize a weaker spring. By controlling the size and strength of the spring 260, the relief valve assembly 225 may thus be set to open at any predetermined threshold pressure corresponding to any fan speed to prevent damage to the system 12 at high fan speeds.

The present invention provides a fan drive system with increased internal cooling capacity over prior art fan drive systems. The present invention incorporates the advantages of both a friction clutch assembly and of a viscous drive including ability to cycle repeat, engage at higher engine rpm speeds, having varying degrees of engagement, and being able to be fully engaged or fully disengaged. By having variable fan operating speeds the present invention increases vehicle fuel economy, provides more consistent engine cooling, and reduces the amount of time that a radiator cooling fan is operating in a fully engaged mode.

Additionally, the present invention through use of pitot tubes, provides an inexpensive engagement circuit and cooling and lubrication circuit entirely inclusive in a single housing assembly. The present invention also provides fail-safe capability in that it is capable of defaulting to an engaged state or fan operative state when the main controller is inoperative.

Furthermore, the present invention minimizes fan drive system operating noise by being capable of hydraulically engaging a radiator cooling fan at multiple selected or predetermined slower partially engaged speeds rather than at a fully engaged speed, when a fully engaged speed is not required.

Also, the present invention provides precise electronic control, via an analog or pulse width modulated actuation, for controlling the fluid pressure within the pitot tube used to engage the fan.

The present invention also provides an additional failsafe method by limiting the fluid pressure in the pitot tube to a maximum threshold fluid pressure during any type of operation to aid in protecting the fan, and most importantly the cover/housing structure, from damage due to fluid pressure buildup.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method of engaging a hydraulically controlled fan drive system comprising:
   containing a hydraulic fluid within a housing assembly;
   receiving at least a portion of said hydraulic fluid via a pitot tube;
   engaging said housing assembly to said fan shaft in response to a supply of said hydraulic fluid from said first pitot tube;
   coupling a relief valve assembly between said first pitot tube and a fluid reservoir in said housing assembly;
   electrically coupling said relief valve assembly to a main controller;
   electrically coupling at least one sensor to said main controller;
   mechanically controlling said relief valve assembly to control said supply of said hydraulic fluid within said first pitot tube at or below a predetermined maximum threshold pressure; and
   electronically controlling said relief valve assembly through said main controller to control said supply of said hydraulic fluid within said pitot tube when said fluid pressure is at or below said predetermined maximum threshold pressure.

2. The method of claim 1, wherein coupling a relief valve assembly comprises coupling a relief valve assembly between said first pitot tube and a fluid reservoir in said housing assembly, said relief valve assembly comprising:
   a valve body having an inner cavity and a pair of vents, said pair of vents being fluidically coupled to said fluid reservoir;
   a coil bobbin coupled to said valve body;
   a pole piece closely coupled to said coil bobbin;
   a flux tube coupled to said pole piece;
   a spring retainer coupled within said pole piece;
   a spring coupled to said spring retainer and contained within a cavity region, said cavity region defined by said valve body, said coil bobbin and said pole piece;
   an armature assembly coupled within said inner cavity and said cavity region, said armature assembly having a valve and an armature, said armature closely coupled to said spring within said cavity region and said valve contained within said inner cavity, wherein said armature assembly is capable of axial movement towards and away from said spring between an open position and a closed position, said closed position defined wherein said valve seals to said pair of vents and said wherein said valve unseals frown said pair of vents to allow a quantity of hydraulic fluid to pass from the pitot tube through said vent, said spring normally biasing said armature assembly in said closed position; and
   a coil contained between said flux tube and said coil bobbin.

3. The method of claim 2, wherein electronically controlling said relief valve assembly through said main controller comprises introducing an electrical current from said main controller to said coil, said coil generating a magnetic flux proportional to an electric current supplied from said main controller, said magnetic flux moving said armature assembly from said closed position to said open position to allow a first amount of fluid to escape through said pair of vents to said fluid reservoir.

4. The method of claim 2, wherein electronically controlling said relief valve assembly through said main controller comprises introducing a pulse width modulated electrical current from said main controller to said coil, said coil generating a magnetic flux proportional to an electric current supplied from said main controller, said magnetic flux moving said armature assembly from said closed position to said open position to allow a first amount of fluid to escape through said pair of vents to said fluid reservoir.

5. The method of claim 2, wherein electronically controlling said relief valve assembly through said main controller comprises introducing an analog electrical current from said main controller to said coil, said coil generating a magnetic flux proportional to an electric current supplied from said main controller, said magnetic flux moving said armature assembly from said closed position to said open position to allow a first amount of fluid to escape through said pair of vents to said fluid reservoir.

6. The method of claim 2, wherein electronically controlling said relief valve assembly through said main controller comprises:
   sensing an engine operating condition using said at least one sensor;
   sending an electrical signal from said at least one sensor to said main controller;
   sending an electrical current to said coil from said main controller as a function of said electrical signal.

7. The method of claim 2, wherein mechanically controlling said relief valve assembly to control said supply of said hydraulic fluid within said first pitot tube comprising urging said armature assembly from said closed position to said open position when said fluid pressure is above said maximum threshold fluid pressure.

* * * * *

UNITED STATES PATENT AND TRADEMARK OFFICE
CERTIFICATE OF CORRECTION

| | | |
|---|---|---|
| PATENT NO. | : 7,249,664 B2 | Page 1 of 1 |
| APPLICATION NO. | : 11/079040 | |
| DATED | : July 31, 2007 | |
| INVENTOR(S) | : James E. Ignatovich, Theodore A. Malott and Dale Pickelman | |

It is certified that error appears in the above-identified patent and that said Letters Patent is hereby corrected as shown below:

Column 10, Line 10: "frown" should read -- from --

Signed and Sealed this
Twenty-eighth Day of February, 2012

David J. Kappos
*Director of the United States Patent and Trademark Office*